United States Patent Office 3,502,653
Patented Mar. 24, 1970

---

3,502,653
PROCESS FOR PREPARING 1,4-DIAZA-CYCLOHEPTENES
Giuseppe Cantatore and Alberto Bonvicini, Terni, Italy, assignors to Montecatini Edison S.p.A., Milan, Italy
No Drawing. Filed Feb. 21, 1967, Ser. No. 617,509
Claims priority, application Italy, Feb. 25, 1966, 4,329/66
Int. Cl. C07d 53/02
U.S. Cl. 260—239  9 Claims

ABSTRACT OF THE DISCLOSURE

Preparation of alkyl substituted 1,4-diaza-cycloheptenes by reacting an alkyl diamine with an alpha, beta-unsaturated aliphatic carbonyl compound in the presence of a condensing agent which is preferably an alkali or alkaline earth metal hydroxide, carbonate or alkoxide. As new products: 5,7-dimethyl-1,4-diaza-4-cycloheptene, tetramethyl-1,4-diaza-4-cycloheptene (obtained by reacting mesityl oxide with 1,2-propylene diamine).

BACKGROUND OF THE INVENTION

Field of the invention

The present invention relates to the preparation of substituted 1,4-diaza-4-cycloheptenes having the general formula:

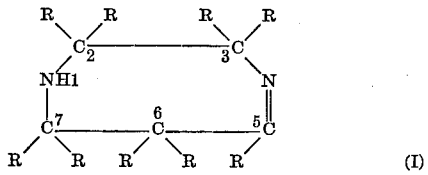

(I)

wherein R is selected from hydrogen atoms and equal or different alkyl radicals, preferably having 1 to 12, preferably 1 to 3, carbon atoms.

Description of the prior art

Alkyl derivatives of 1,4-diaza-4-cycloheptene obtained by the reaction of ethylenediamine with alpha, beta unsaturated aliphatic ketones are already known. (A. Nawojski, Wiadomosci Chemiczne 19 (2) (212), 75–93 (1965)). More particularly, 5,7,7-trimethyl-1,4-diaza-4-cycloheptene was prepared by starting with ethylene diamine and mesityl oxide (Guareschi (Beilstein XXIII, 36)); Mushkalo (Zhur. Obshchei Khim, 30, 1023–8 (1960)) and Sprague (PB rept. 135.342 (C. A. 54, 12155i)). The best yields were obtained by Mushkalo and amounted to 56%.

The same product was also obtained from ethylene diamine and diacetone-alcohol (yield of 43%) and from ethylene diamine and acetone (yield of 30%) (Sprague, mentioned above).

Moreover 7-methyl-5,7-diethyl-1,4-diaza-4-cycloheptene was obtained by the aforementioned Mushkalo and Spraque, starting with ethylene diamine and 3-methyl-3-hepten-5-one, with yields of 60% and 41%, respectively.

SUMMARY OF THE INVENTION

We have now surprisingly found that it is possible to obtain, with improved yields as compared to those of the processes heretofore described in the literature, alkyl derivatives of 1,4-diaza-4-cycloheptene, having the general Formula I by reacting, in the presence of condensing agents, diamines of the general formula:

$$NH_2-C(R)_2-C(R)_2-NH_2 \quad (II)$$

with alpha, beta unsaturated aliphatic carbonyl compounds of the general formula:

$$(R)_2C=C(R)-C(R)=0 \quad (III)$$

wherein R is, in each case, as defined above in connection with Formula I.

More particularly, the reaction is carried out, in accordance with the present invention, in the presence of condensing agents consisting of substances having a dehydrating character, and preferably having a basic character, such as the hydroxides, carbonates and alkoxides of alkali and alkaline earth metals, such as $K_2CO_3$, NaOH, KOH, CaO, MgO, $Al_2O_3$, $CH_3ONa$, $C_2H_5ONa$, etc.

The process of the present invention, besides affording the possibility of obtaining previously known products in higher yields, also makes it possible to obtain products whose preparation has previously been tried without success (see Sprague as regards 5,7-dimethyl-1,4-diaza-4-cycloheptene) as well as products which were not previously known (e.g., tetramethyl-1,4-diaza-4-cycloheptene).

DESCRIPTION OF THE PREFERRED EMBODIMENTS

The reaction is preferably carried out in hydrocarbon solvents, such as heptane, cyclohexane, petroleum ether and the like, but can also be carried out in solvents of the ether type (ethyl ether, dioxane, etc.) or of alcohol type such as methyl, ethyl alcohol, etc., or, if desired, in the absence of solvents.

Preferred diamines are ethylene diamine, 1,2-propylenediamine, 2,3-diamine butane etc.

Preferred $\alpha,\beta$-unsaturated aliphatic carbonyl compounds are mesityl oxide, methylpropenylketone, 3-methyl-3-heptene-5-one, methylisopropenylketone, 3-methyl-3-pentene-2-one, etc.

The two reactants, namely the diamine and the alpha, beta unsaturated aliphatic ketone, are preferably used in equimolar ratios. However, an excess up to 20% of either reactant can also be used.

The reaction is preferably carried out at temperatures between about —20° and +100° C.

The products of the present invention can be used as intermediates for organic synthesis, more particularly for the preparation (by catalytic hydrogenation) of alkyl derivatives of homopiperazine (as it is disclosed in our copending application Ser. No. 614,551, filed Feb. 8, 1967, and having the title "Dye-Receptive Compositions Comprising Synthetic High Molecular Weight Polymers and Process for Their Preparation") suitable to increase the dye-receptivity of polyolefins.

The following examples are presented to further illustrate the present invention without in any way limiting its scope.

Example 1

196 g. (2 mols) of mesityl oxide diluted with 300 cc. of cyclohexane were added within 30 minutes, while agitating, to 120 g. (2 mols) of anhydrous ethylene diamine, keeping the temperature between 15 and 25° C. with running water; and then 200 g. of anhydrous $K_2CO_3$ were added. The reaction mixture was kept under agitation for 15 hours at 15° to 25° C. and then filtered and the residue washed with 300 cc. of methanol. After having removed the solvents from the filtrate by distillation, the filtrate was fractionated under reduced pressure.

256 g. (yield 91%) of 5,7,7-trimethyl-1,4-diaza-4-cycloheptane were obtained. The product was a colorless liquid having the following properties:

Boiling point=96–97°/22 mm. Hg;
$n_D^{20}=1.4818$;
Nitrogen percent=19.9 (calculated for $C_8H_{16}N_2=19.98$)

Example 2

196 g. (2 mols) of mesityl oxide were diluted with 300 cc. of heptane, were added to 120 g. (2 mols) of anhydrous ethylene diamine while keeping the temperature between 10° and 30° C. and agitating; and then 200 g. of anhydrous $K_2CO_3$ were added. The reaction mixture was heated for 1 hour at 80° C. and then filtered. The residue was washed with 300 cc. of heptane.

After having removed the solvent therefrom, the filtrate was fractionated under reduced pressure. 239 g. (yield 85%) of 5,7,7-trimethyl-1,4-diaza-4-cycloheptene were obtained. It had the following properties:

Boiling point=87–88°/14 mm. Hg,
$n_D^{20}$=1.4816.

Example 3

196 g. (2 mols) of mesityl oxide were diluted with 300 cc. of heptane and then added to 120 g. (2 mols) of anhydrous ethylene diamine, while keeping the temperature at between 15° to 30° C. After agitating for 2 hours, 50 g. of NaOH were added. The reaction mixture was agitated for another hour at 20–25° C., and then filtered and the residue washed with 100 cc. of heptane. The solvent was removed from the filtrate by distillation and the filtrate fractionated under reduced pressure.

249 g. (yield 89%) of 5,7,7-trimethyl-1,4-diaza-4-cycloheptene were obtained. It had the following properties:

Boiling point=89–90°/16 mm. Hg;
$n_D^{20}$=1.4816.

Example 4

168 g. (2 mols) of methyl propenyl ketone, diluted with 300 cc. of heptane, were added to 120 g. (2 mols) of anhydrous ethylene diamine, while agitating and cooling to a temperature between 10 and 20° C. 200 g. of anhydrous $K_2CO_3$ were added and the mixture heated for 1 hour at 55–60° C. The whole reaction mixture was filtered, the $K_2CO_3$ washed with 400 cc. of heptane, the solvent removed from the filtrate by distillation and the filtrate then fractionated under reduced pressure. 154 g. (yield 61%) of 5,7-dimethyl-1,4-diaza-4-cycloheptene were obtained. The product was a colorless liquid having the following properties:

Boiling point=82–83°/13 mm. Hg;
$n_D^{20}$=1.4860;
Nitrogen percent=22.3 (calculated for $C_7H_{14}N_2$=22.2).

This compound was not known heretofore in the literature.

Example 5

196 g. (2 mols) of mesityl oxide, diluted with 300 cc. of heptane, were added, while agitating, to 148 g. (2 mols) of anhydrous 1,2-propylene diamine, while cooling to a temperature between 15° and 35° C. The reaction mixture was agitated for 1 hour, 80 g. of KOH were then added, and the agitation then continued for 15 minutes. The heptane phase was then separated from the aqueous phase.

The solvent was then removed from the heptane phase and the residue fractionated under reduced pressure. 250 g. (yield 81%) of tetramethyl-1,4-diaza-4-cycloheptene were obtained. This product was a colorless liquid having the following properties:

Boiling point=97–98°/22 mm. Hg;
Nitrogen percent=18.3 (calculated for $C_9H_{18}N_2$=18.16);
$n_D^{20}$=1.4735.

This compound was known heretofore in the literature.

Example 6

252 g. (2 mols) of 3-methyl-3-hepten-5-one diluted with 300 cc. of heptane were added, while agitating, to 120 g. (2 mols) of anhydrous ethylene diamine, at a temperature of 25° to 30° C.; and then 200 g. of anhydrous $K_2CO_3$ were added. The reaction mixture was kept under agitation for some hours. It was then filtered and the residue washed with 300 cc. of methanol. The solvents were removed from the filtrate by distillation, and the filtrate fractionated under reduced pressure.

272 g. (yield 81%) of 7-methyl-5,7-diethyl-1,4-diaza-4-cycloheptene were obtained. The product was a colorless liquid having the following properties:

Boiling point=99–101°/8 mm. Hg;
$n_D^{20}$=1.4844;
Nitrogen percent =16.56 (calculated for $C_{10}H_{20}N_2$=16.65)

Variations can, of course, be made without departing from the spirit and scope of the invention.

Having thus described our invention, what we desire to secure by Letters Patent and hereby claim is:

1. A process for preparing alkyl derivatives of 1,4-diaza-4-cycloheptene having the formula,

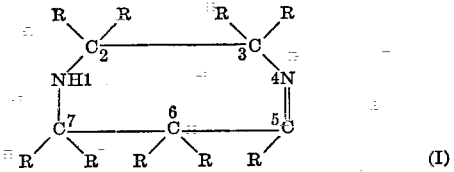

in which R is selected from the group consisting of hydrogen atoms and equal or different alkyl radicals having 1 to 12 carbon atoms, said process comprising reacting a diamine having the formula,

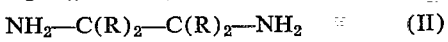

wherein R is as defined above, with an alpha, beta-unsaturated aliphatic carbonyl compound having the formula,

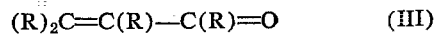

wherein R is as defined above, said reaction being carried out in the presence of a condensing agent selected from the group consisting of the hydroxides, carbonates and alkoxides of the alkali and alkaline earth metals.

2. The process of claim 1 wherein the condensing agent is KOH.

3. The process of claim 1 wherein the condensing agent is NaOH.

4. The process of claim 1 wherein the condensing agent is $K_2CO_3$.

5. The process of claim 1 wherein the diamine is ethylene diamine.

6. The process of claim 1 wherein the diamine is 1,2-propylene diamine.

7. The process of claim 1 wherein the alpha, beta-unsaturated carbonyl compound is mesityl oxide.

8. The process of claim 1 wherein the alpha, beta-unsaturated carbonyl compound is methyl-propenyl-ketone.

9. The process of claim 1 wherein the alpha, beta-unsaturated carbonyl compound is 3-methyl-3-hepten-5-one.

References Cited

UNITED STATES PATENTS 3,040,029  6/1962  Poppelsdorf et al. _____ 260—239

OTHER REFERENCES

Mushkalo et al.: Chem. Abstracts, vol. 55, pp. 563–564 (1961).

Mushkalo et al.: Zhur. Obschei Khim., vol. 30, pp. 1023–1028 (1960).

ALTON D. ROLLINS, Primary Examiner

U.S. Cl. X.R.

260—93.7

PO-1050
(5/69)

UNITED STATES PATENT OFFICE
CERTIFICATE OF CORRECTION

Patent No. 3,502,653　　　　　　　Dated March 24, 1970

Inventor(s) GIUSEPPE CANTATORE and ALBERTO BONVICINI

It is certified that error appears in the above-identified patent and that said Letters Patent are hereby corrected as shown below:

Column 1, lines 30-36, first structural formula

"
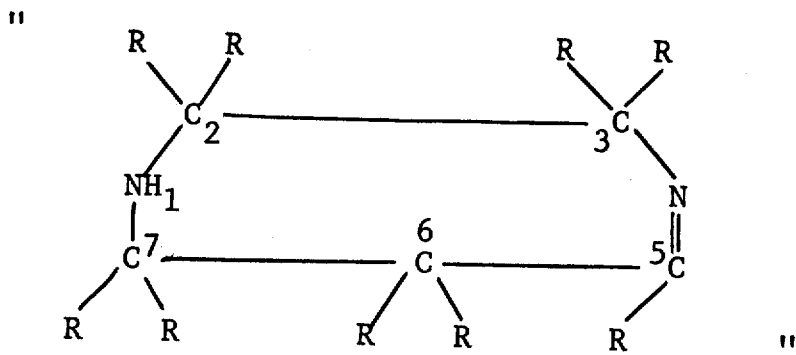
"

should read

--
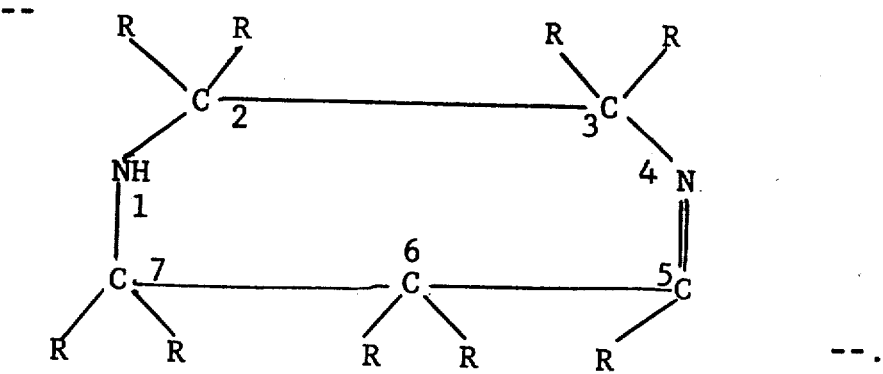
--.

PR

UNITED STATES PATENT OFFICE
CERTIFICATE OF CORRECTION

Patent No. 3,502,653          Dated March 24, 1970

Inventor(s) Giuseppe Cantatore et al.      Page - 2

It is certified that error appears in the above-identified patent and that said Letters Patent are hereby corrected as shown below:

Column 1, line 50,, "(1960))" should read -- (1960) --.
Column 2, line 64, "heptane" should read -- heptene --.
Column 3, line 66, "was known" should read -- was not known --.

Signed and sealed this 11th day of August 1970.

(SEAL)
Attest:

EDWARD M. FLETCHER, JR.
Attesting Officer

WILLIAM E. SCHUYLER, JR.
Commissioner of Patents